(12) United States Patent
Yu et al.

(10) Patent No.: US 11,310,801 B2
(45) Date of Patent: Apr. 19, 2022

(54) COMMUNICATION METHOD, CORE NETWORK DEVICE, AND ACCESS NETWORK DEVICE

(71) Applicant: HUAWEI TECHNOLOGIES CO., LTD., Guangdong (CN)

(72) Inventors: Fang Yu, Beijing (CN); Yan Li, Beijing (CN); Hui Ni, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 82 days.

(21) Appl. No.: 16/588,146

(22) Filed: Sep. 30, 2019

(65) Prior Publication Data

US 2020/0029322 A1 Jan. 23, 2020

Related U.S. Application Data

(63) Continuation of application No. PCT/CN2017/079331, filed on Apr. 1, 2017.

(51) Int. Cl.
*H04W 72/04* (2009.01)
*H04L 45/42* (2022.01)
*H04W 28/16* (2009.01)
*H04W 48/06* (2009.01)
*H04W 48/18* (2009.01)

(52) U.S. Cl.
CPC ........... *H04W 72/048* (2013.01); *H04L 45/42* (2013.01); *H04W 28/16* (2013.01); *H04W 48/06* (2013.01); *H04W 48/18* (2013.01)

(58) Field of Classification Search
CPC ... H04W 72/048; H04W 28/16; H04W 48/06; H04W 48/18; H04W 8/065; H04W 60/00; H04L 45/42
See application file for complete search history.

(56) References Cited

U.S. PATENT DOCUMENTS

2015/0126235 A1 5/2015 Cho et al.
2017/0245316 A1* 8/2017 Salkintzis ............. H04W 76/10
(Continued)

FOREIGN PATENT DOCUMENTS

CN 105307131 A 2/2016
CN 105491664 A 4/2016
(Continued)

OTHER PUBLICATIONS

3GPP TS 23.501 V0.3.1 (Mar. 2017), "3rd Generation Partnership Project; Technical Specification Group Services and System Aspects; System Architecture for the 5G System; Stage 2 (Release 15)," Mar. 2017, 97 pages.
(Continued)

*Primary Examiner* — Michael K Phillips
(74) *Attorney, Agent, or Firm* — Fish & Richardson P.C.

(57) ABSTRACT

The present disclosure relates to communication methods, core network devices, and access network devices. One example method includes receiving, by a core network device, a first message from an access network device, where the first message carries information used to indicate a slice supported by the access network device, and determining, by the core network device, a location area identity list of user equipment UE based on the information used to indicate the slice supported by the access network device.

20 Claims, 6 Drawing Sheets

(56) References Cited

U.S. PATENT DOCUMENTS

| | | | |
|---|---|---|---|
| 2017/0303259 A1* | 10/2017 | Lee | H04W 12/08 |
| 2018/0227871 A1* | 8/2018 | Singh | H04W 12/068 |
| 2018/0270744 A1* | 9/2018 | Griot | H04W 88/18 |
| 2019/0021047 A1* | 1/2019 | Zong | H04W 8/26 |
| 2019/0037531 A1* | 1/2019 | Pantus | H04W 68/00 |
| 2019/0174358 A1* | 6/2019 | Gao | H04W 28/18 |
| 2019/0357129 A1* | 11/2019 | Park | H04W 48/18 |
| 2019/0357131 A1* | 11/2019 | Sivavakeesar | H04W 36/0069 |
| 2019/0373441 A1* | 12/2019 | Ryu | H04W 48/18 |
| 2019/0387393 A1* | 12/2019 | Xu | H04W 8/08 |
| 2020/0015066 A1* | 1/2020 | Zhu | H04W 8/18 |
| 2020/0077356 A1* | 3/2020 | Youn | H04W 8/065 |
| 2020/0092706 A1* | 3/2020 | Kawasaki | H04W 60/00 |
| 2020/0120570 A1* | 4/2020 | Youn | H04W 36/0033 |

FOREIGN PATENT DOCUMENTS

| | | | |
|---|---|---|---|
| CN | 105898894 A | 8/2016 | |
| CN | 106210042 A | 12/2016 | |
| CN | 106375987 A | 2/2017 | |
| EP | 3327992 A1 | 5/2018 | |
| EP | 3493648 A1 | 6/2019 | |
| JP | 2017035273 A | 2/2017 | |
| JP | 2018142818 A | 9/2018 | |
| JP | 2019520765 A | 7/2019 | |
| WO | 2017012402 A1 | 1/2017 | |
| WO | 2017140341 A1 | 8/2017 | |
| WO | 2018021861 A1 | 2/2018 | |

OTHER PUBLICATIONS

Extended European Search Report issued in European Application No. 17903098.6 dated Feb. 11, 2020, 10 pages.
LG Electronics Inc, "Text proposal on RAN selection of CN entitY," 3GPP TSG-RAN WG3 Meeting #84, R3-162676, Reno, Nevada, USA, Nov. 14-18, 2016, 4 pages.
Office Action issued in Chinese Application No. 201780055328.5 dated Apr. 3, 2020, 15 pages (with English translation).
PCT International Search Report and Written Opinion issued in International Application No. PCT/CN2017/079331 dated Dec. 29, 2017, 17 pages (with English translation).
SA2, "Response to LS on Network slicing and QoS for New Radio (S2-167116/R3-163167)." 3GPP SA WG2 Meeting #118, S2-170601, Spokane, Washington, USA, Jan. 16-20, 2017, 3 pages.
Silva et al., "Impact of network slicing on 5G Radio Access Networks," 2016 European Conference on Networks and Communications (EuCNC), Sep. 8, 2016, 5 pages.
Sony, "Mobility and RAN slicing," 3GPP TSG RAN WG2 Meting #97, R2-1701510, Athens, Greece, Feb. 13-17, 2017, 4 pages.
EPO Communication pursuant to Article 94(3) EPC issued in European Application 17903098.6 dated Aug. 31, 2020, 6 pages.
LG Electronics Inc., "Mobility procedure considering network slice," 3GPP TSG-RAN WG3 Meeting #95bis, R3-171129, Spokane, Washington, USA, Apr. 3-7, 2017, 4 pages.
Ericsson, "Is UE AS slice agnostic or not?," 3GPP TSG-RAN WG2 #97bis, R2-1702554, Spokane, WA, USA, Apr. 3-7, 2017, 5 pages.
LG Electronics, SK Telecom, ZTE, "TS 23.502 P-CR new procedure on NW initiated UE configuration update," SA WG2 Meeting #120, S2-171854, Busan, Korea, Mar. 27-31, 2017, 5 pages.
Office Action issued in Japanese Application No. 2019-553891 dated Jan. 12, 2021, 13 pages (with English translation).
3GPP TR 23.799 V14.0.0 (Dec. 2016), "3rd Generation Partnership Project;Technical Specification Group Services and System Aspects;Study on Architecture for Next Generation System(Release 14)," Dec. 2016, 522 pages.
Ericsson, "Radio interface implications of network slicing," 3GPP TSG-RAN WG2 #95bis, Tdoc R2-166931, Kaohsiung, Taiwan, Oct. 10-14, 2016, 7 pages.
Huawei, "Support of Network Slice Discovery," 3GPP TSG-RAN WG3 Meeting #93bis, R3-162462, Sophia Antipolis, France, Oct. 10-14, 2016, 4 pages.
Office Action issued in Korean Application No. 2019-7028216 dated Apr. 29, 2021, 4 pages (with English translation).
Office Action issued in Japanese Application No. 2019-553891 dated Sep. 21, 2021, 6 pages (with English translation).

* cited by examiner

COMMUNICATION METHOD, CORE NETWORK DEVICE, AND ACCESS NETWORK DEVICE

CROSS-REFERENCE TO RELATED APPLICATIONS

This application is a continuation of International Application No. PCT/CN2017/079331, filed on Apr. 1, 2017, the disclosure of which is hereby incorporated by reference in its entirety.

TECHNICAL FIELD

This application relates to the communications field, and more specifically, to a communication method, a core network device, and an access network device.

BACKGROUND

A network slice (NS)-based network architecture is proposed in a fifth-generation (5G) communications system, to meet differentiated user requirements. A radio access network (RAN) device and a core network (CN) device need to obtain, from each other, information about slices respectively supported by the RAN device and the CN device, so that a corresponding procedure is performed during processing of signaling of user equipment (UE), to select a proper network slice for the UE.

Currently, obtaining the information about the slices between the RAN device and the CN device needs to rely on a cross-domain end-to-end slice management system E2E Slice Manager. In other words, information sharing between the CN device and the RAN device needs to be implemented by using their respective network management systems and an E2E slice management system, resulting in relatively complex implementation.

SUMMARY

Embodiments of this application provide a communication method, a core network device, and an access network device, so that the access network device and the core network device notify each other of information about slice capabilities respectively supported by the access network device and the core network device. This facilitates easy implementation, and a location area identity list of UE can be determined, thereby preventing a paging message from being sent in an unnecessary scope.

According to a first aspect, a communication method is provided. The method includes:

receiving, by a core network device, a first message from an access network device, where the first message carries information used to indicate a slice supported by the access network device; and determining, by the core network device, a location area identity list of user equipment UE based on the information about the slice supported by the access network device.

In this embodiment of this application, the core network device may directly receive the sent first message from the access network device, where the first message carries the information used to indicate the slice supported by the access network device; and then determine the location area identity list of the user equipment UE based on the information about the slice supported by the access network device, thereby preventing a paging message from being sent in an unnecessary scope.

For example, a location area may be a tracking area. For example, the location area identity list may be a tracking area identity (TAI) list.

Optionally, the core network device may be an AMF node, an AMF device, or an MME.

Optionally, the access network device may be a RAN node or a RAN device.

Optionally, information about a slice supported by a RAN node may include a cell ID and network slice selection assistance information (NSSAI) supported by a cell or single network slice selection assistance information (S-NSSAI) supported by a cell. The NSSAI supported by the cell may include a slice/service type (SST) of one or more slices supported by the cell. In addition, the NSSAI supported by the cell may further include supplementary information, for example, a tenant ID or an identity of a group to which the UE belongs (UE group ID), used to distinguish slices having a same SST.

In some possible implementations, the first message is a connection setup request message, the connection setup request message is used by the access network device to set up a connection to the core network device, and the method further includes:

sending, by the core network device, a connection setup response message to the access network device, where the connection setup response message carries information used to indicate a slice supported by the core network device, and the information about the slice supported by the core network device is used by the access network device to select the core network device for the UE.

In some possible implementations, the first message is a broadcast message.

In some possible implementations, the determining, by the core network device, a location area identity list of UE based on the information about the slice supported by the access network device includes:

determining, by the core network device based on information about one or more slices to which the UE is allowed to access and obtained information about one or more slices supported by the access network device, whether the access network device or a cell covered by the access network device is located in a location area of the UE.

In some possible implementations, the method further includes:

sending, by the core network device, a configuration update message to the access network device, where the configuration update message is used to update the information about the slice supported by the core network device.

In some possible implementations, the method further includes:

receiving, by the core network device, a configuration update message from the access network device, where the configuration update message is used to update the information about the slice supported by the access network device.

In some possible implementations, the method further includes:

sending, by the core network device, indication information to the access network device, where the indication information is used to instruct the access network device to reselect a core network device for the UE.

In some possible implementations, the information about the slice supported by the core network device is used to identify network slice selection assistance information NSSAI corresponding to one or more slices supported by the core network device or single network slice selection assistance information S-NSSAI respectively corresponding to one or more slices supported by the core network device; or the information about the slice supported by the core network device includes a slice identity ID.

For example, information about a slice supported by an AMF node may include an ID of NSSAI supported by the AMF node or an ID of S-NSSAI supported by the AMF node, and optionally, may further include capacity information of the slice. The NSSAI supported by the AMF node may include an SST of one or more slices supported by the AMF node, and optionally, may further include supplementary information, for example, a tenant ID or an identity of a group to which the UE belongs (UE group ID), used to distinguish slices having a same SST.

Optionally, in this embodiment of this application, the information about the slice supported by the core network device may be identified by using an end-to-end (E2E) slice ID.

In some possible implementations, the information about the slice supported by the core network device is used to indicate whether the core network device is a default core network device.

In other words, the information about the slice supported by the core network device may include information used to indicate a property of the core network device. The property is used to represent whether the core network device is a default core network device. For example, for a default AMF node, if after receiving a signaling service request of the UE, a RAN node cannot determine a proper AMF node for the UE based on information provided by the UE, the RAN node forwards the signaling service request of the UE to the default AMF node, and the default AMF node determines a proper AMF node for the UE.

In some possible implementations, the information about the slice supported by the core network device includes a group identity of a core network device group to which the core network device belongs, and the core network device group includes one or more core network devices supporting a same slice.

According to a second aspect, a communication method is provided. The method includes:

sending, by an access network device, a connection setup request message to a core network device, and receiving a connection setup response message from the core network device, where the connection setup response message carries information used to indicate a slice supported by the core network device; and selecting, by the access network device, the core network device for user equipment UE based on the information about the slice supported by the core network device.

In this embodiment of this application, the access network device sends the connection setup request message to the core network device and receives the connection setup response message from the core network device, where the connection setup response message carries the information used to indicate the slice supported by the core network device, so that the core network device can be selected for the user equipment UE based on the information that is of the slice supported by the core network device and that is carried in the connection setup response message.

In some possible implementations, the connection setup request message carries information about a slice supported by the access network device, and the information about the slice supported by the access network device is used by the core network device to determine a location area identity list of the UE.

Optionally, the information about the slice supported by the core network device may alternatively be carried in a broadcast message sent by the core network device. To be specific, after a new core network device goes online, the new core network device may also notify, by using the broadcast message, the access network device of information about a slice supported by the new core network device. Optionally, the access network device may determine, based on the information about the slice supported by the new core network device, to set up a connection to the new core network device; and send the connection setup request message to the new core network device, where the connection setup request message carries the information about the slice supported by the access network device.

In some possible implementations, the method further includes:

receiving, by the access network device, a configuration update message from the core network device, where the configuration update message is used to update the information about the slice supported by the core network device.

In some possible implementations, the method further includes:

sending, by the access network device, a configuration update message to the core network device, where the configuration update message is used to update the information about the slice supported by the access network device.

In some possible implementations, the method further includes:

receiving, by the access network device, indication information sent by the core network device; and reselecting, by the access network device, a core network device for the UE according to the indication information.

In some possible implementations, the information about the slice supported by the core network device is used to identify network slice selection assistance information NSSAI corresponding to one or more slices supported by the core network device or single network slice selection assistance information S-NSSAI respectively corresponding to one or more slices supported by the core network device; or the information about the slice supported by the core network device includes a slice identity ID.

For example, information about a slice supported by an AMF node may include an ID of NSSAI supported by the AMF node or an ID of S-NSSAI supported by the AMF node, and optionally, may further include capacity information of the slice. The NSSAI supported by the AMF node may include an SST of one or more slices supported by the AMF node, and optionally, may further include supplementary information, for example, a tenant ID or an identity of a group to which the UE belongs (UE group ID), used to distinguish slices having a same SST.

Optionally, in this embodiment of this application, the information about the slice supported by the core network device may be identified by using an E2E slice ID.

In some possible implementations, the information about the slice supported by the core network device is used to indicate whether the core network device is a default core network device.

In other words, the information about the slice supported by the core network device may include information used to indicate a property of the core network device. The property is used to represent whether the core network device is a default core network device. For example, for a default AMF node, if after receiving a signaling service request of the UE, a RAN node cannot determine a proper AMF node for the UE based on information provided by the UE, the RAN node forwards the signaling service request of the UE to the default AMF node, and the default AMF node determines a proper AMF node for the UE.

In some possible implementations, the information about the slice supported by the core network device includes a group identity of a core network device group to which the core network device belongs, and the core network device group includes one or more core network devices supporting a same slice.

According to a third aspect, a core network device is provided. The device is configured to perform the method according to any one of the first aspect or the possible implementations of the first aspect. Specifically, the core network device includes units configured to perform the method according to any one of the first aspect or the possible implementations of the first aspect.

According to a fourth aspect, an access network device is provided. The device is configured to perform the method according to any one of the second aspect or the possible implementations of the second aspect. Specifically, the access network device includes units configured to perform the method according to any one of the second aspect or the possible implementations of the second aspect.

According to a fifth aspect, a core network device is provided. The core network device includes a processor, a memory, and a communications interface. The processor is connected to the memory and the communications interface. The memory is configured to store an instruction, the processor is configured to execute the instruction, and the communications interface is configured to communicate with another network element under control of the processor. When the processor executes the instruction stored in the memory, the execution enables the processor to perform the method according to any one of the first aspect or the possible implementations of the first aspect.

According to a sixth aspect, an access network device is provided. The access network device includes a processor, a memory, and a communications interface. The processor is connected to the memory and the communications interface. The memory is configured to store an instruction, the processor is configured to execute the instruction, and the communications interface is configured to communicate with another network element under control of the processor. When the processor executes the instruction stored in the memory, the execution enables the processor to perform the method according to any one of the second aspect or the possible implementations of the second aspect.

According to a seventh aspect, a computer readable storage medium is provided. The computer readable storage medium stores a program, and the program enables a core network device to perform the communication method according to any one of the first aspect or the implementations of the first aspect.

According to an eighth aspect, a computer readable storage medium is provided. The computer readable storage medium stores a program, and the program enables an access network device to perform the communication method according to any one of the second aspect or the implementations of the second aspect.

DESCRIPTION OF EMBODIMENTS

The following describes technical solutions of this application with reference to accompanying drawings.

It should be understood that the embodiments of this application may be applied to various communications systems supporting a network slice-based architecture, for example, a global system for mobile communications (GSM), a code division multiple access (CDMA) system, a wideband code division multiple access (WCDMA) system, a general packet radio service (GPRS) system, a long term evolution (LTE) system, an advanced long term evolution (LTE-A) system, a universal mobile telecommunications system (UMTS), or a next-generation communications system, such as a new radio (NR) system, an evolved LTE (eLTE) communications system, or a fifth-generation (5G) communications system.

Figure 1:
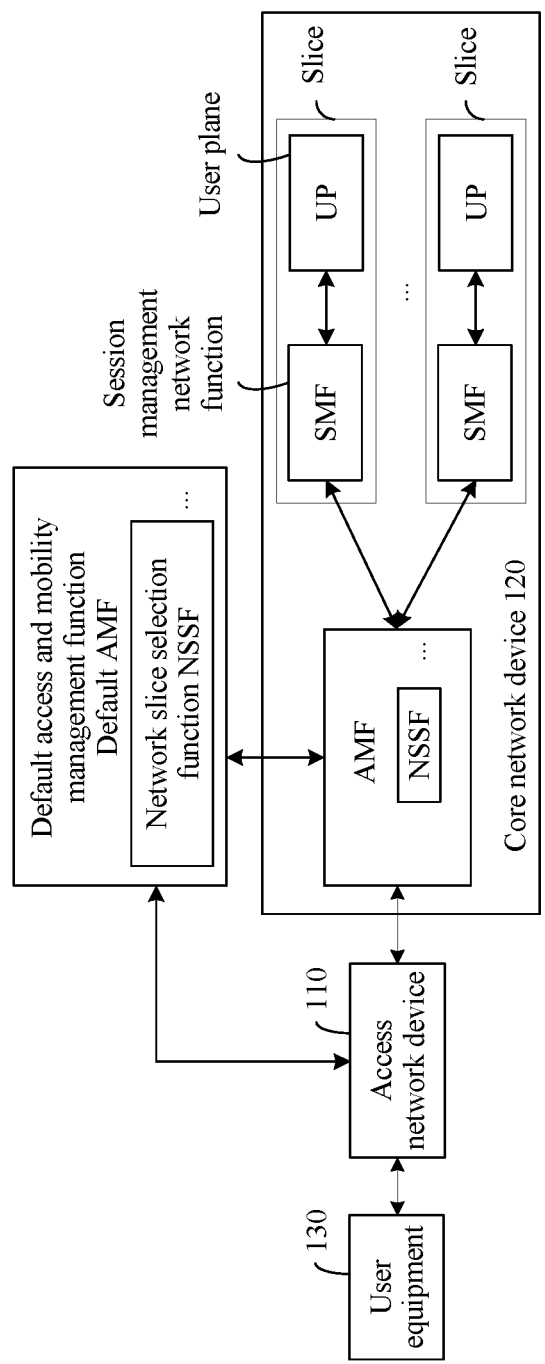
FIG. 1 is a schematic diagram of a wireless communications system to which an embodiment of this application is applied.

FIG. 1 is a schematic diagram of a wireless communications system to which an embodiment of this application is applied. The wireless communications system may include an access network (RAN) device 110, a core network (CN) device 120, and user equipment (UE) 130. The communications system in this embodiment of this application supports a network slice-based architecture. Network slices (referred to as "slices") of a core network in the communications system may share a network device of the core network and/or a network resource of the core network, or each may exclusively occupy a network device of the core network and/or a network resource of the core network. As shown in FIG. 1, in the wireless communications system, the UE 130 accesses one or more slices via the RAN device 110. Specifically, the RAN device 110 selects an AMF for the UE 130 based on information provided by the UE 130 and configured or obtained access and mobility management function (AMF) information.

The RAN device 110 may be an access point (AP) in a WLAN or a base transceiver station (BTS) in GSM or CDMA; may be a NodeB (NB) in WCDMA; or may be an evolved NodeB (eNB or eNodeB), a relay station or an access point, an in-vehicle device, or a wearable device in LTE, a network device in a future 5G network, or a network device in a future evolved PLMN, for example, may be a generation base station gNB connected to a 5G core network device, a transmission and reception point (TRP), a centralized processing unit (Centralized Unit, CU), a distributed processing unit (Distributed Unit, DU), or the like.

The CN device 120 may be a control-plane (CP) network function (NF) and a user-plane (UP) network function in a 5G network, for example, a session management network function (SMF) or an AMF.

When the UE 130 accesses a plurality of slices at a same time, the plurality of slices share some control-plane network functions. The shared control-plane network functions include at least the AMF function. A network slice selection function (NSSF) is configured to select a specific slice for the UE. The NSSF may be located in the AMF function as a logical function and, or may be deployed independently as a device entity. In this embodiment of this application, it is assumed that the NSSF is located in the AMF as a logical function (as shown in FIG. 1). Each slice includes at least an SMF function and an UP network function. Generally, there are a plurality of slices and a plurality of AMF functions in the network. The UE accesses an AMF device via the RAN device, thereby accessing one or more slices connected to the AMF device. These slices share an AMF function. For example, in FIG. 1, if the UE 130 accesses a plurality of slices at a same time, the RAN device 110 needs to select a proper AMF function for the UE 130 based on information about a slice supported by the AMF function.

Optionally, FIG. 1 further provides a default AMF function. If the RAN device 110 cannot determine a proper AMF based on the information provided by the UE 130 or the configured or obtained AMF information, the RAN device 110 forwards a request message to the default AMF, for example, forwards a service request of the UE 130 to the default AMF, so that the default AMF selects a proper AMF for the UE 130. Optionally, the default AMF function may be understood as a default AMF device.

In addition, in this embodiment of this application, the RAN device 110 provides a service for a cell. The UE 130 communicates with the CN device 120 by using a transmission resource (for example, a frequency domain resource, or a spectrum resource) used by the cell, and the cell may be a cell corresponding to a network device (for example, a base station). The cell may belong to a macro base station, may be a hyper cell, or may belong to a base station corresponding to a small cell. The small cell herein may include a metro cell, a micro cell, a pico cell, a femto cell, and the like. These cells have features such as a small coverage area and low transmit power and are suitable for providing a high-rate data transmission service.

The wireless communications system may further include at least one UE 130 located in a coverage area of the RAN device 110. In this embodiment of this application, the UE may also be referred to as a terminal device, an access terminal, a subscriber unit, a subscriber station, a mobile station, a mobile console, a remote station, a remote terminal, a mobile device, a user terminal, a terminal, a wireless communications device, a user agent, or a user apparatus. The terminal device may be a station (ST) in a wireless local area network (WLAN), or may be a cellular phone, a cordless phone, a session initiation protocol (SIP) phone, a wireless local loop (WLL) station, a personal digital assistant (PDA) device, a handheld device having a wireless communication function, a relay device, a computing device, another processing device connected to a wireless modem, an in-vehicle device, a wearable device, a terminal device in a next-generation communications system such as a 5G network, a terminal device in a future evolved public land mobile network (PLMN), or the like.

As an example rather than a limitation, in this embodiment of this application, the UE may alternatively be a wearable device. The wearable device may also be referred to as a wearable intelligent device, and is a generic term of wearable devices, such as glasses, gloves, watches, clothing, and shoes, developed by performing intelligent design on daily wear by using a wearable technology. The wearable device is a portable device directly worn on a body or integrated into clothes or an accessory of a user. The wearable device is more than a hardware device, and implements powerful functions through software support, data exchange, and cloud exchange. In a broad sense, wearable intelligent devices include a large-sized device, for example, a smartwatch or smart glasses, that provide comprehensive functions and that can implement a complete or partial function independent of a smartphone; and include a device, for example, various types of smart bands and smart jewelry for somatic feature monitoring, that is intended for only a specific type of application functions and that needs to be used in conjunction with another device such as a smartphone.

The following describes a communication method according to the embodiments of this application with reference to FIG. 2 to FIG. 6.

It should be understood that FIG. 2 to FIG. 6 are schematic flowcharts of the communication method according to the embodiments of this application, and show detailed communication steps or operations of the method. However, these steps or operations are only examples. Alternatively, in the embodiments of this application, another operation or variations of the operations in FIG. 2 to FIG. 6 may be performed. In addition, the steps in FIG. 2 to FIG. 6 may be performed in sequences different from the sequences presented in FIG. 2 to FIG. 6, and it may be unnecessary to perform all the operations in FIG. 2 to FIG. 6.

Figure 2:
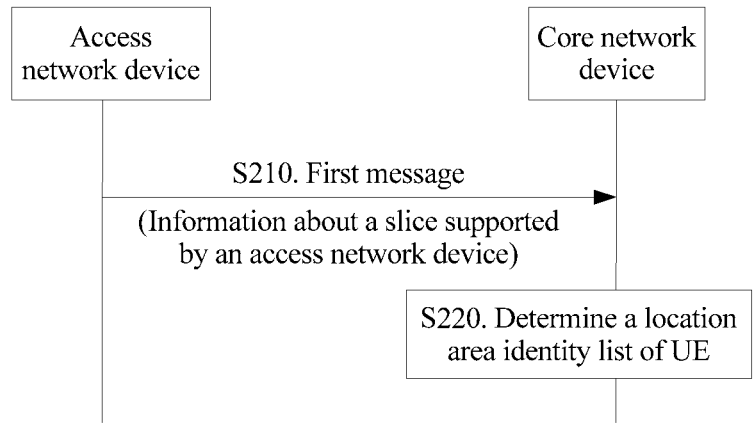
FIG. 2 is a schematic interaction diagram of a communication method according to an embodiment of this application.

FIG. 2 is a schematic interaction diagram of a communication method 200 according to an embodiment of this application. As shown in FIG. 2, the method 200 includes the following steps:

S210. A core network device receives a first message from an access network device, where the first message carries information used to indicate a slice supported by the access network device.

Optionally, the core network device (for example, the core network device 120 shown in FIG. 1) may be an AMF node, an AMF device, or an MME. For ease of description, the AMF node is used as an example for description below.

Optionally, the access network device (for example, the access network device 110 shown in FIG. 1) may be a RAN node or a RAN device. For ease of description, the RAN node is used as an example for description below.

Optionally, information about a slice supported by the RAN node may include a cell ID and NSSAI supported by a cell or S-NSSAI supported by a cell. The NSSAI supported by the cell may include a slice/service type (SST) of one or more slices supported by the cell. In addition, the NSSAI supported by the cell may further include supplementary information, for example, a tenant ID or an identity of a group to which UE belongs (UE group ID), used to distinguish slices having a same SST.

S220. The core network device determines a location area identity list of user equipment UE based on the information about the slice supported by the access network device.

For example, a location area may be a tracking area. For example, the location area identity list may be a TAI list.

Optionally, S220 may include:

determining, by the core network device based on information about a slice to which the UE is allowed to access and the obtained information about the slice supported by the access network device, whether the access network device or a cell covered by the access network device is located in a location area of the UE.

Specifically, for example, the AMF node may determine the location area identity list of the UE based on the information about the slice to which the UE is allowed to access, namely accepted/allowed NSSAI of the UE, the obtained information about the slice supported by the RAN node, and a current location of the UE. In other words, the AMF node may directly determine the location area identity list of the UE with reference to the information about the slice supported by the RAN node and the information about the slice to which the UE is allowed to access.

There may be another case: The AMF node updates the location area identity list of the UE based on the information about the slice supported by the RAN node and the information about the slice to which the UE is allowed to access. Specific descriptions are as follows:

Optionally, if the AMF node has determined a first location area identity list (which may be understood as an existing location area identity list in the prior art) for the UE in advance, in this embodiment of this application, the AMF node may further determine or update the location area identity list of the UE based on the information about the slice to which the UE is allowed to access, namely the accepted/allowed NSSAI of the UE, and the obtained information about the slice supported by the RAN node.

Specifically, for example, if the AMF node determines that a RAN node in the first location area identity list or a cell covered by the RAN node cannot support the accepted/allowed NSSAI of the UE, the RAN node or the cell covered by the RAN node may be deleted from the first location area identity list, to generate a second location area identity list. The second location area identity list may be understood as an updated location area identity list.

Optionally, the second location area identity list may be explicitly represented. For example, the second location area identity list may be a part of the first location area identity list except a specific RAN node or a specific cell covered by a specific RAN node. Optionally, the second location area identity list may alternatively be represented in another manner, for example, may be implicitly represented. This is not limited in this embodiment of this application.

It should be understood that "the first location area identity list" and "the second location area identity list" introduced herein are only intended to facilitate description and to distinguish between location area identity lists before and after the update, and do not limit this embodiment of this application.

In this way, when downlink data arrives at the UE in idle mode, the AMF node can learn of information about a RAN node in the location area identity list, to send a paging message to the RAN node in the location area identity list. This prevents the paging message from being sent in an unnecessary scope.

In this embodiment of this application, the core network device may directly receive the sent first message from the access network device, where the first message carries the information used to indicate the slice supported by the access network device; and then determine the location area identity list of the user equipment UE based on the information about the slice supported by the access network device, thereby preventing the paging message from being sent in an unnecessary scope.

Optionally, the first message may be a connection setup request message, and the method 200 may further include:

sending, by the core network device, a connection setup response message to the access network device, where the connection setup response message carries information used to indicate a slice supported by the core network device, and the information about the slice supported by the core network device is used by the access network device to select the core network device for the UE. This is further described with reference to FIG. 3.

Optionally, the first message may alternatively be a broadcast message. Specifically, after a new access network device goes online, the new access network device may notify, by using the broadcast message, the core network device of information about a slice supported by the new access network device.

For example, the first message may be a broadcast message sent by a RAN node, and the broadcast message is used by the RAN node to notify a plurality of groups of AMF nodes of information about a slice supported by the RAN node.

Specifically, for example, if a new RAN node goes online, the new RAN node may send a broadcast message (that is, a first message) to the plurality of groups of AMF nodes, where the broadcast message carries information about a slice supported by the new RAN node. Optionally, an AMF node may determine, based on the information about the slice supported by the new RAN node, whether a connection needs to be created. When a connection needs to be created, the AMF node sends a connection setup request message to the new RAN node, where the connection setup request message carries information about a slice supported by the AMF node. Further descriptions are provided below with reference to FIG. 6.

Figure 3:
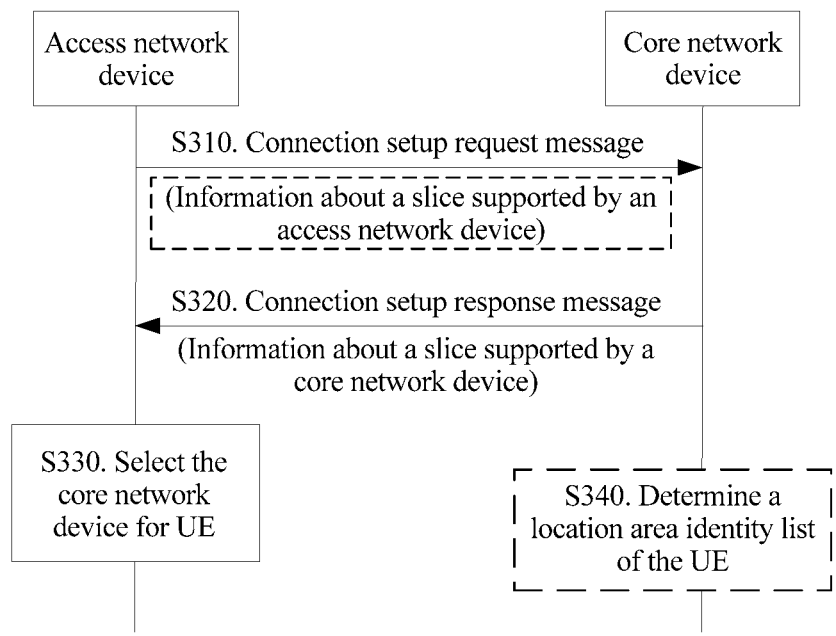
FIG. 3 is a schematic interaction diagram of a communication method according to another embodiment of this application.

FIG. 3 is a schematic interaction diagram of a communication method 300 according to another embodiment of this application. As shown in FIG. 3, the method 300 may include the following steps.

S310. An access network device sends a connection setup request message to a core network device, where the connection setup request message is used by the access network device to set up a connection to the core network device.

S320. The core network device sends a connection setup response message to the access network device, where the connection setup response message carries information about a slice supported by the core network device.

S330. The access network device selects the core network device for UE based on the information about the slice supported by the core network device.

Optionally, in this embodiment of this application, the information about the slice supported by the core network device is used to identify network slice selection assistance information NSSAI corresponding to one or more slices supported by the core network device or single network slice selection assistance information S-NSSAI respectively corresponding to one or more slices supported by the core network device; or the information about the slice supported by the core network device includes a slice identity ID.

For example, information about a slice supported by an AMF node may include an ID of NSSAI supported by the AMF node or an ID of S-NSSAI supported by the AMF node, and optionally, may further include capacity information of the slice. The NSSAI supported by the AMF node may include an SST of one or more slices supported by the AMF node, and optionally, may further include supplementary information, for example, a tenant ID or an identity of a group to which the UE belongs (UE group ID), used to distinguish slices having a same SST.

Optionally, in this embodiment of this application, the information about the slice supported by the core network device may be identified by using an E2E slice ID. For example, information about a slice supported by a RAN node includes an E2E slice ID. Correspondingly, the information about the slice supported by the AMF node is also identified by using an E2E slice ID. Further, the RAN node may select the AMF node for the UE based on the E2E slice ID supported by the AMF node. The AMF node may determine a location area identity list of the UE based on the E2E slice ID supported by the RAN node and a correspondence between an E2E slice ID and NSSAI.

Optionally, the information about the slice supported by the core network device may be used to indicate whether the core network device is a default core network device. In other words, the information about the slice supported by the core network device may include information used to indicate a property of the core network device. The property is used to represent whether the core network device is a default core network device. For example, for a default AMF node, if after receiving a signaling service request of the UE, a RAN node cannot determine a proper AMF node for the UE based on information provided by the UE, the RAN node forwards the signaling service request of the UE to the default AMF node, and the default AMF node determines a proper AMF node for the UE.

Optionally, the information about the slice supported by the core network device includes a group identity (AMF Group ID) of a core network device group to which the core network device belongs, and the core network device group (for example, an AMF Group) includes one or more core network devices (for example, AMF nodes) supporting a same slice.

It should be understood that the foregoing listed information about the slice supported by the core network device may be mutually combined for use. This is not limited herein. It should be further understood that the information about the slice supported by the core network device may further include other proper information. This is not limited in this embodiment of this application.

Specifically, for example, when a connection (an N2 connection or an S1 connection) is to be created between the RAN node and the AMF node, the RAN node may send a connection setup request message (that is, a first message) to the AMF node. Then, the AMF node may reply to the RAN node with a connection setup response or acknowledgement message, where the connection setup response or acknowledgement message carries the information about the slice supported by the AMF node. The RAN node may select the AMF node for the UE based on the information about the slice supported by the AMF node and the information provided by the UE. Therefore, this facilitates easy implementation, and may further reduce signaling overheads brought by sequent AMF redirection.

Optionally, the connection setup request message may carry information about a slice supported by the access network device, and the method 300 may further include the following step:

S340. The core network device determines the location area identity list of the UE based on the information about the slice supported by the access network device.

For example, during connection setup, the core network device and the access network device may notify each other of the information about the supported slices. For example, when an N2 connection is to be set up between the RAN node and the AMF node, the RAN node and the AMF node may notify each other of the information about the slices. For another example, when an S1 connection is to be set up between the RAN node and an MME, the RAN node and the MME may notify each other of information about slices.

Specifically, for example, when a connection (an N2 connection or an S1 connection) is to be created between the RAN node and the AMF node, the RAN node may send a connection setup request message to the AMF node, where the connection setup request message carries the information about the slice supported by the RAN node, so that the AMF node determines the location area identity list of the UE based on the information about the slice supported by the RAN node. Herein, for specific implementation of determining the location area identity list of the UE by the AMF node, refer to the foregoing descriptions. Details are not described herein again. Further, the AMF node may reply to the RAN node with a connection setup response or acknowledgement message, where the connection setup response or acknowledgement message carries the information about the slice supported by the AMF node, so that the RAN node selects the AMF node for the UE based on the information about the slice supported by the AMF node.

Optionally, in this embodiment of this application, the RAN node and the AMF node may perform matching on the information about the slices supported by the other parties. If the matching is successful, a connection may be set up; or if the matching fails, the AMF node may refuse to set up a connection. Specifically, for example, the AMF node may match the information about the slice supported by the RAN node with the information about the slice supported by the AMF node. If the matching fails, the AMF node rejects the connection setup request message sent by the RAN node.

For example, if a type of the slice supported by the RAN node is enhanced mobile broadband (eMBB) and ultra-reliable and low latency communications (URLLC), but a type of the slice supported by the AMF node is massive Internet of things (m-IoT), the AMF node rejects a connection setup request sent by the RAN node. Optionally, the AMF node may initiate a process of releasing a transport network layer (TNL) connection.

In other words, the AMF node may reject, based on the information about the slice of the RAN node, to set up a connection. This can avoid setting up a useless connection, thereby saving resources.

In this embodiment of this application, the information about the slice supported by the access network device and the information about the slice supported by the core network device may be carried in an existing message without a need to specifically introduce a new message, thereby reducing overheads. For example, the existing message may be a connection setup request message or a connection setup response message in a connection setup process, a broadcast message, a configuration update message, or another proper message. This is not limited in this embodiment of this application.

Optionally, similarly, the information about the slice supported by the core network device may alternatively be carried in a broadcast message sent by the core network device. To be specific, after a new core network device goes online, the new core network device may also notify, by using the broadcast message, the access network device of information about a slice supported by the new core network device. Optionally, the access network device may determine, based on the information about the slice supported by the core network device, to set up a connection to the core network device; and send the connection setup request message to the core network device, where the connection setup request message carries the information about the slice supported by the access network device.

Specifically, for example, if a new AMF node goes online, the new AMF node may send a broadcast message to a RAN node in a coverage area of the new AMF node, where the broadcast message carries information about a slice supported by the new AMF node. Then, the RAN node may determine, based on the information about the slice supported by the new AMF node, whether a connection needs to be created. When a connection needs to be created, the RAN node sends a connection setup request message to the new AMF node, where the connection setup request message carries information about a slice supported by the RAN node. Further descriptions are provided below with reference to FIG. 5.

Optionally, the method 200 or the method 300 may further include:

sending, by the core network device, a configuration update message to the access network device, where the configuration update message is used to update the information about the slice supported by the core network device.

Optionally, after the core network device sends the configuration update message to the access network device, the method 200 or the method 300 may further include:

sending, by the core network device, indication information to the access network device, where the indication information is used to instruct the access network device to reselect a core network device for the UE.

Correspondingly, the access network device reselects a core network device for the UE according to the indication information.

Specifically, for example, when the information about the slice supported by the AMF node is changed or updated, the AMF node may add information about a new slice of the AMF node to the configuration update message, and send the information about the new slice to the RAN node by using the configuration update message, so that the RAN node updates, based on the configuration update message, the information about the slice supported by the AMF node. In addition, the AMF node may further send indication information to the RAN node, to notify the RAN node that an AMF may be reselected. Correspondingly, the RAN node may reselect an AMF for the UE based on the information about the new slice of the AMF node and the indication information. In other words, the RAN node may trigger, based on the information about the new slice of the AMF node, AMF reselection for the UE.

Optionally, the method 200 or the method 300 may further include:

sending, by the access network device, a configuration update message to the core network device, where the configuration update message is used to update the information about the slice supported by the access network device.

Specifically, for example, when the information about the slice supported by the RAN node is changed or updated, the RAN node may add information about a new slice of the RAN node to the configuration update message, and send the information about the new slice to the AMF node by using the configuration update message, so that the AMF node updates, based on the configuration update message, the information about the slice supported by the RAN node. Correspondingly, the AMF node may update the location area identity list of the UE based on the information about the new slice of the RAN node, and send an updated location area identity list to the UE, so that the UE updates the location area identity list. In other words, the AMF node may update, based on information about a new slice supported by the RAN node, a location area identity list of UE that is in an active state.

In summary, the RAN node and the AMF node each can send a configuration update message, to update the information about the slices respectively supported by the RAN node and the AMF node. This helps the UE select a more proper slice or helps update the location area identity list of the UE in a timely manner.

Figure 4:
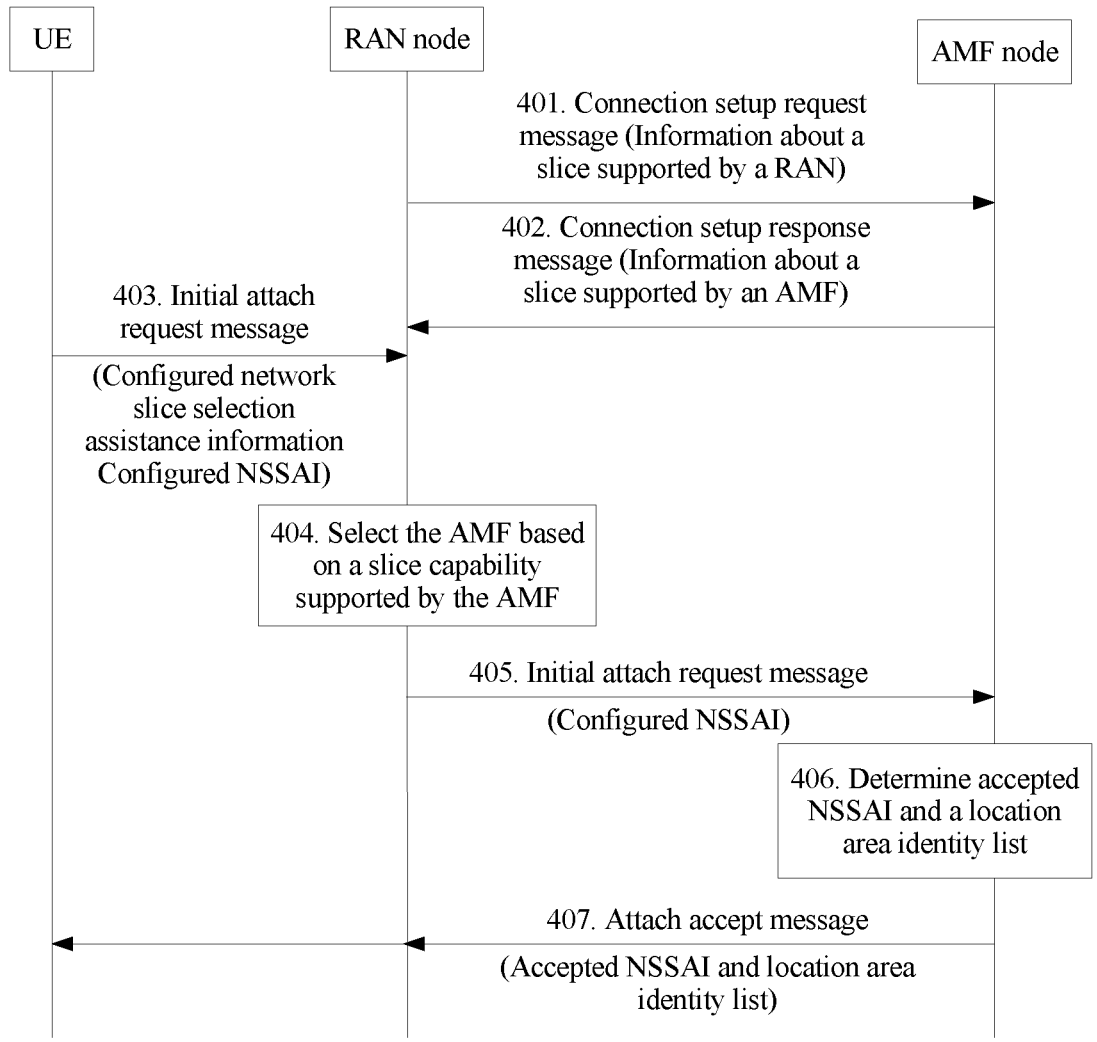
FIG. 4 is a schematic diagram of an example according to an embodiment of this application.

To help a person skilled in the art understand the technical solutions of the embodiments of this application, descriptions are provided below with reference to FIG. 4 to FIG. 6. Examples in FIG. 4 to FIG. 6 all may be applied to the communications system shown in FIG. 1. FIG. 4 is a schematic diagram of an example according to an embodiment of this application. As shown in FIG. 4, the following steps are included:

401. A RAN node sends a connection setup request message to an AMF node.

Herein, the connection setup request message may carry information about a slice supported by the RAN node.

402. The AMF node replies to the RAN node with a connection setup acknowledgement message.

Similarly, the connection setup acknowledgement message may carry information about a slice supported by the AMF node.

For details about steps 401 and 402, refer to related detailed descriptions in the communication method 200 and the communication method 300 in the foregoing embodiments. Details are not described herein again.

403. UE sends an initial attach request message to the RAN node.

Herein, the initial attach request message may carry configured NSSAI. Optionally, the initial attach request message may alternatively be a registration request message.

For example, the configured NSSAI may be default NSSAI configured on the UE. Accepted NSSAI may be NSSAI returned to the UE after an operator PLMN accepts the attach request message of the UE. The UE adds the accepted NSSAI to a subsequent non-access stratum (NAS) message.

404. The RAN node selects an AMF based on a slice capability supported by the AMF.

In other words, the RAN node may select the AMF for the UE based on the obtained information about the slice supported by the AMF node.

For details about step 404, refer to related detailed descriptions in the communication method 300. Details are not described herein again.

405. The RAN node sends the initial attach request message to the AMF node.

After selecting the AMF node, the RAN node may forward the initial attach request message of the UE to the AMF node.

406. The AMF node determines the accepted NSSAI and a location area identity list of the UE.

For details about step 406, refer to related detailed descriptions in the communication method 200 and the communication method 300 in the foregoing embodiments. Details are not described herein again.

For example, the AMF node may query subscription information of the UE, determine the accepted NSSAI of the UE based on the configured NSSAI and the subscription information of the UE, and then determine the location area identity list for the UE based on the accepted NSSAI and the information about the slice supported by the RAN node.

407. The AMF node sends an attach accept message.

Optionally, the attach accept message may alternatively be a registration accept message.

Herein, the AMF node may send the attach accept message to the UE via the RAN node, where the attach accept message carries the accepted NSSAI, the location area identity list, and other information of the UE.

For example, after the RAN node and the AMF node notify each other of the information about the slices, the RAN node may receive the initial attach request message of the UE, select the AMF for the UE based on the information about the slice of the AMF node, and forward a service request message of the UE to the selected AMF node. After receiving the service request message of the UE, the AMF node may query the subscription information of the UE, determine the accepted NSSAI of the UE that can be received, and further determine the location area identity list of the UE. Herein, the AMF node may generate the location area identity list of the UE based on the information about the slice supported by the RAN node, thereby reducing paging overheads of the UE and reducing signaling overheads of an air interface.

In other words, in a process in which the RAN node sets up a connection to the AMF node, the RAN node and the AMF node may notify each other of the information about the slices respectively supported by the RAN node and the AMF node, so that the RAN node can determine the AMF node for the UE based on the information about the slice supported by the AMF node. In this way, the selected AMF node may determine the location area identity list for the UE based on the information about the slice supported by the RAN node, thereby preventing a paging message of the UE from being sent in an unnecessary scope.

Figure 5:
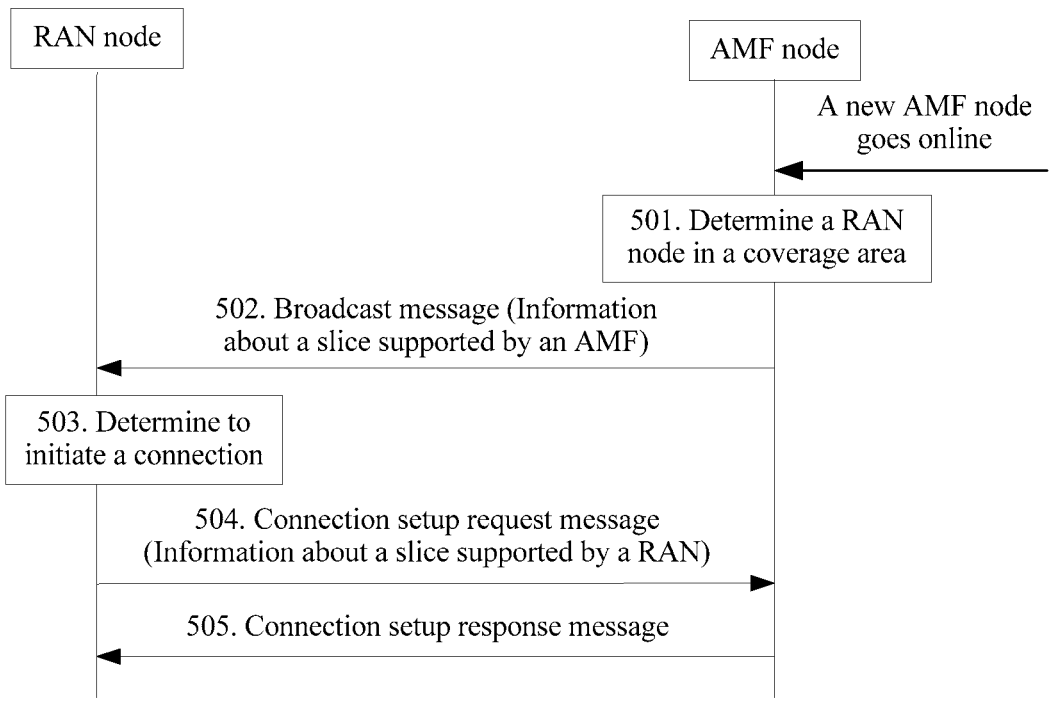
FIG. 5 is a schematic diagram of another example according to an embodiment of this application.

FIG. 5 is a schematic diagram of another example according to an embodiment of this application. Different from that in FIG. 4, in FIG. 5, information about a slice supported by an AMF node may be carried in a broadcast message. As shown in FIG. 5, the following steps are included:

501. The AMF node determines a RAN node in a coverage area.

Herein, when an AMF node is added, the new AMF node may determine a RAN node in a coverage area.

502. The AMF node sends a broadcast message to the RAN node, where the broadcast message carries the information about the slice supported by the AMF node.

503. The RAN node determines to initiate a connection.

504. The RAN node sends a connection setup request message to the AMF node.

The RAN node may determine, based on the broadcast message sent by the AMF node, whether to initiate a connection; and when determining to initiate a connection, send the connection setup request message to the AMF node, where the connection setup request message carries information about a slice supported by the RAN node.

For details about steps 502 and 504, refer to related detailed descriptions in the communication method 200 and the communication method 300 in the foregoing embodiments. Details are not described herein again.

505. The AMF node sends a connection setup acknowledgement message to the RAN node.

The AMF node has added, to the broadcast message, the information about the slice supported by the AMF node. Therefore, the AMF node may no longer add, to the connection setup acknowledgement message, the information about the slice supported by the AMF node.

It should be noted that in FIG. 5, after the RAN node sets up a connection to the AMF node, a subsequent operation performed based on signaling of the UE is similar to that in FIG. 4. For example, steps 403 to 407 in FIG. 4 may be subsequently performed in FIG. 5. For brevity, details are not described herein again.

Figure 6:
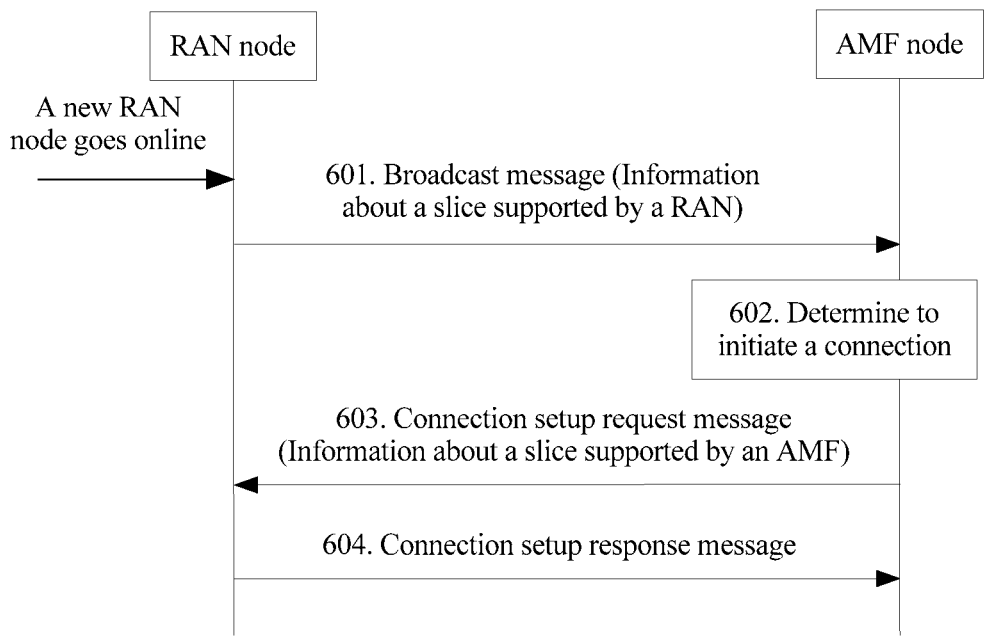
FIG. 6 is a schematic diagram of still another example according to an embodiment of this application.

FIG. 6 is a schematic diagram of still another example according to an embodiment of this application. Different from that in FIG. 4, in FIG. 6, information about a slice supported by a RAN node may be carried in a broadcast message. As shown in FIG. 6, the following steps are included:

601. The RAN node sends a broadcast message to an AMF node, where the broadcast message carries the information about the slice supported by the RAN node.

Herein, when a RAN node is added, the new RAN node may send a broadcast message to the AMF node, to notify the AMF node of information about a slice supported by the new RAN node.

602. The AMF node determines to initiate a connection.

603. The AMF node sends a connection setup request message to the RAN node.

The AMF node may determine, based on the broadcast message sent by the RAN node, whether to initiate a connection; and when determining to initiate a connection, send the connection setup request message to the RAN node, where the connection setup request message carries information about a slice supported by the AMF node.

For details about steps 601 and 603, refer to related detailed descriptions in the communication method 200 and the communication method 300 in the foregoing embodiments. Details are not described herein again.

604. The RAN node sends a connection setup response message to the AMF node.

The RAN node has added, to the broadcast message, the information about the slice supported by the RAN node. Therefore, the RAN node may no longer add, to the connection setup acknowledgement message, the information about the slice supported by the RAN node.

It should be noted that in FIG. 6, after the RAN node sets up a connection to the AMF node, a subsequent operation performed based on signaling of the UE is similar to that in FIG. 4. For example, steps 403 to 407 in FIG. 4 may be subsequently performed in FIG. 6. For brevity, details are not described herein again.

It should be understood that the examples in FIG. 4 to FIG. 6 are merely examples of possible implementations in the embodiments of this application, and there may be other steps or operations in actual application. This is not limited herein.

The foregoing describes the communication method according to the embodiments of this application. The following describes a core network device and an access network device according to the embodiments of this application with reference to FIG. 7 to FIG. 10.

Figure 7:
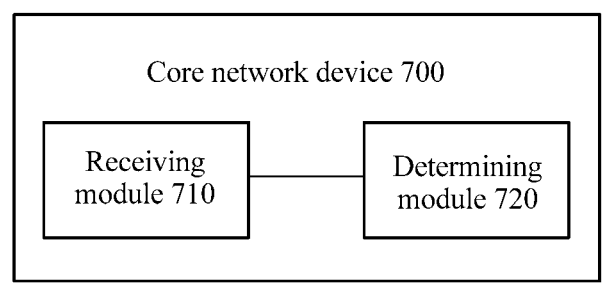
FIG. 7 is a schematic block diagram of a core network device according to an embodiment of this application.

FIG. 7 is a schematic block diagram of a core network device 700 according to an embodiment of this application. As shown in FIG. 7, the core network device 700 includes:

a receiving module 710, configured to receive a first message from an access network device, where the first message carries information used to indicate a slice supported by the access network device; and a determining module 720, configured to determine a location area identity list of user equipment UE based on the information about the slice supported by the access network device.

Optionally, the first message is a connection setup request message, the connection setup request message is used by the access network device to set up a connection to the core network device, and the core network device 700 further includes:

a first sending module, configured to send a connection setup response message to the access network device, where the connection setup response message carries information used to indicate a slice supported by the core network device, and the information about the slice supported by the core network device is used by the access network device to select the core network device for the UE.

Optionally, the first message is a broadcast message.

Optionally, the determining module 720 is specifically configured to:

determine, based on information about one or more slices to which the UE is allowed to access and obtained information about one or more slices supported by the access network device, whether the access network device or a cell covered by the access network device is located in a location area of the UE.

Optionally, the core network device 700 further includes:

a second sending module, configured to send a configuration update message to the access network device, where the configuration update message is used to update the information about the slice supported by the core network device.

Optionally, the receiving module 710 is further configured to:

receive a configuration update message from the access network device, where the configuration update message is used to update the information about the slice supported by the access network device.

Optionally, the core network device 700 further includes:

a third sending module, configured to send indication information to the access network device, where the indication information is used to instruct the access network device to reselect a core network device for the UE.

Optionally, the information about the slice supported by the core network device is used to identify network slice selection assistance information NSSAI corresponding to one or more slices supported by the core network device or single network slice selection assistance information S-NSSAI respectively corresponding to one or more slices supported by the core network device; or the information about the slice supported by the core network device includes a slice identity ID.

Optionally, the information about the slice supported by the core network device is used to indicate whether the core network device is a default core network device.

Optionally, the information about the slice supported by the core network device includes a group identity of a core network device group to which the core network device belongs, and the core network device group includes one or more core network devices supporting a same slice.

The core network device 700 according to this embodiment of this application may perform a core network device-side method in the communication method according to the embodiments of this application. In addition, the foregoing and other operations and/or functions of the modules in the core network device 700 are separately intended for implementing corresponding processes in the foregoing methods. For brevity, details are not described herein again.

Therefore, the core network device 700 according to this embodiment of this application may directly receive the sent first message from the access network device, where the first message carries the information used to indicate the slice supported by the access network device; and then determine the location area identity list of the user equipment UE based on the information about the slice supported by the access network device, thereby preventing a paging message from being sent in an unnecessary scope.

Figure 8:
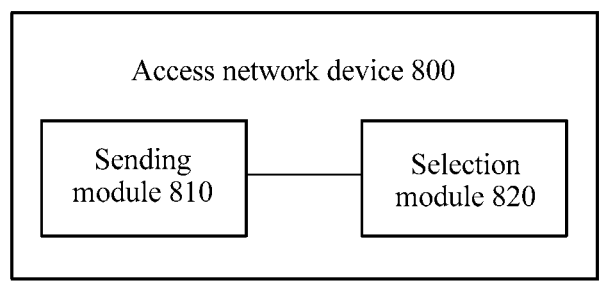
FIG. 8 is a schematic block diagram of an access network device according to an embodiment of this application.

FIG. 8 is a schematic block diagram of an access network device 800 according to an embodiment of this application. As shown in FIG. 8, the access network device 800 includes:

a sending module 810, configured to send a connection setup request message to a core network device, and receive a connection setup response message from the core network device, where the connection setup response message carries information used to indicate a slice supported by the core network device; and a selection module 820, configured to select the core network device for user equipment UE based on the information about the slice supported by the core network device.

Optionally, the connection setup request message carries information about a slice supported by the access network device, and the information about the slice supported by the access network device is used by the core network device to determine a location area identity list of the UE.

Optionally, the access network device 800 further includes:

a receiving module, configured to receive a configuration update message from the core network device, where the configuration update message is used to update the information about the slice supported by the core network device.

Optionally, the sending module 810 is further configured to:

send a configuration update message to the core network device, where the configuration update message is used to update the information about the slice supported by the access network device.

Optionally, the sending module 810 is further configured to:

receive indication information sent by the core network device; and the selection module 820 is specifically configured to:

reselect a core network device for the UE according to the indication information.

Optionally, the information about the slice supported by the core network device is used to identify network slice selection assistance information NSSAI corresponding to one or more slices supported by the core network device or single network slice selection assistance information S-NSSAI respectively corresponding to one or more slices supported by the core network device; or the information about the slice supported by the core network device includes a slice identity ID.

Optionally, the information about the slice supported by the core network device is used to indicate whether the core network device is a default core network device.

Optionally, the information about the slice supported by the core network device includes a group identity of a core network device group to which the core network device belongs, and the core network device group includes one or more core network devices supporting a same slice.

The access network device 800 according to this embodiment of this application may perform an access network device-side method in the communication method according to the embodiments of this application. In addition, the foregoing and other operations and/or functions of the modules in the access network device 800 are separately intended for implementing corresponding processes in the foregoing methods. For brevity, details are not described herein again.

Therefore, the access network device 800 according to this embodiment of this application sends the connection setup request message to the core network device and receives the connection setup response message from the core network device, where the connection setup response message carries the information used to indicate the slice supported by the core network device, so that the core network device can be selected for the user equipment UE based on the information that is of the slice supported by the core network device and that is carried in the connection setup response message.

Figure 9:
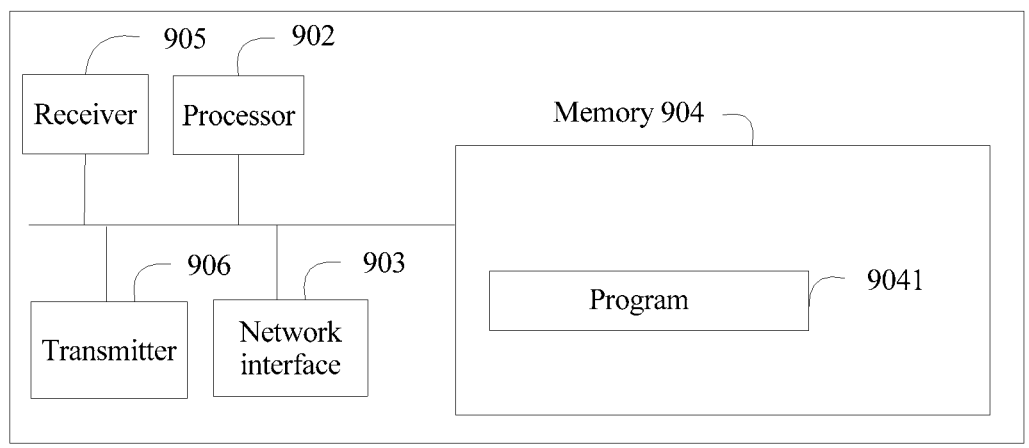
FIG. 9 is a structural block diagram of a core network device according to an embodiment of this application.

FIG. 9 shows a structure of a core network device according to an embodiment of this application. The core network device includes at least one processor 902, for example, a central processing unit (CPU), at least one network interface 903 or another communications interface, and a memory 904. Optionally, the core network device may further include a receiver 905 and a transmitter 906. The processor 902 is configured to execute an executable module, for example, a computer program, stored in the memory 904. The memory 904 may include a high-speed random access memory RAM, or may include a non-volatile memory, for example, at least one magnetic disk memory. A communication connection to at least one other network element is implemented by using the at least one network interface 903 (which may be a wired interface or a wireless interface). The receiver 905 and the transmitter 906 are configured to transmit various signals or information.

In some implementations, the memory 904 stores a program 9041. The program 9041 may be executed by the processor 902 to perform the core network device-side method according to the foregoing embodiments of this application.

Figure 10:
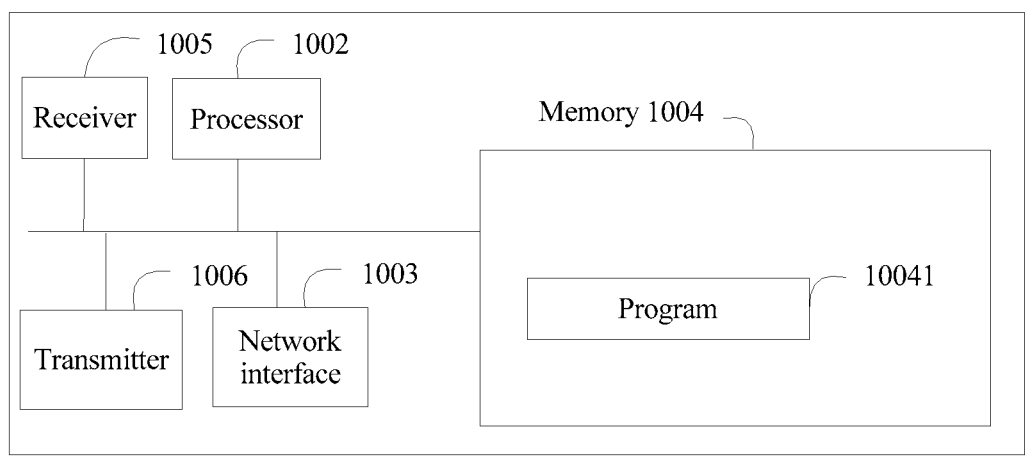
FIG. 10 is a structural block diagram of an access network device according to an embodiment of this application.

FIG. 10 shows a structure of an access network device according to an embodiment of this application. The access network device includes at least one processor 1002 (for example, a CPU), at least one network interface 1003 or another communications interface, and a memory 1004. Optionally, the access network device may further include a receiver 1005 and a transmitter 1006. The processor 1002 is configured to execute an executable module, for example, a computer program, stored in the memory 1004. The memory 1004 may include a high-speed random access memory RAM, or may include a non-volatile memory, for example, at least one magnetic disk memory. A communication connection to at least one other network element is implemented by using the at least one network interface 1003 (which may be a wired interface or a wireless interface). The receiver 1005 and the transmitter 1006 are configured to transmit various signals or information.

In some implementations, the memory 1004 stores a program 10041. The program 10041 may be executed by the processor 1002 to perform the access network device-side method according to the foregoing embodiments of this application.

Terminologies such as "component", "module", and "system" used in this application are used to indicate computer-related entities, hardware, firmware, combinations of hardware and software, software, or software being executed. For example, a component may be, but is not limited to, a process that runs on a processor, a processor, an object, an executable file, a thread of execution, a program, and/or a computer. As shown in figures, both a computing device and an application that runs on a computing device may be components. One or more components may reside within a process and/or a thread of execution, and a component may be located on one computer and/or distributed between two or more computers. In addition, these components may be executed from various computer-readable media that store various data structures. The components may communicate by using a local process and/or a remote process and based on, for example, a signal having one or more data packets (for example, data from two components interacting with another component in a local system, a distributed system, and/or across a network such as the Internet interacting with other systems by using the signal).

It should be noted that the foregoing method embodiments may be applied to a processor, or implemented by a processor. The processor may be an integrated circuit chip and has a signal processing capability. In an implementation process, steps in the foregoing method embodiments may be implemented by using a hardware integrated logical circuit in the processor or by using instructions in a form of software. The foregoing processor may be a general purpose processor, a digital signal processor (DSP), an application-specific integrated circuit (ASIC), a field programmable gate array (FPGA) or another programmable logical device, a discrete gate or transistor logic device, or a discrete hardware component. The processor may implement or perform the methods, the steps, and logical block diagrams that are disclosed in the embodiments of this application. The general purpose processor may be a microprocessor, or the processor may be any conventional processor or the like. Steps of the methods disclosed with reference to the embodiments of this application may be directly performed and accomplished by using a hardware decoding processor, or may be performed and accomplished by using a combination of hardware and software modules in the decoding processor. A software module may be located in a mature storage medium in the art, such as a random access memory, a flash memory, a read-only memory, a programmable read-only memory, an electrically erasable programmable memory, or a register. The storage medium is located in a memory, and a processor reads information in the memory and completes the steps in the foregoing methods in combination with hardware of the processor.

It may be understood that the memory in the embodiments of this application may be a volatile memory or a nonvolatile memory, or may include both a volatile memory and a nonvolatile memory. The nonvolatile memory may be a read-only memory (ROM), a programmable read-only memory (Programmable ROM, PROM), an erasable programmable read-only memory (Erasable PROM, EPROM), an electrically erasable programmable read-only memory (Electrically EPROM, EEPROM), or a flash memory. The volatile memory may be a random access memory (RAM), and is used as an external cache. By example rather than limitative description, many forms of RAMs may be used, for example, a static random access memory (Static RAM, SRAM), a dynamic random access memory (Dynamic RAM, DRAM), a synchronous dynamic random access memory (Synchronous DRAM, SDRAM), a double data rate synchronous dynamic random access memory (Double Data Rate SDRAM, DDR SDRAM), an enhanced synchronous dynamic random access memory (Enhanced SDRAM, ESDRAM), a synchlink dynamic random access memory (Synchlink DRAM, SLDRAM), and a direct rambus dynamic random access memory (Direct Rambus RAM, DR RAM). It should be noted that the memory of the systems and methods described in this specification includes but is not limited to these and any memory of another proper type.

It should be understood that the term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that sequence numbers of the foregoing processes do not mean execution sequences in the various embodiments of this application. The execution sequences of the processes should be determined according to functions and internal logic of the processes, and should not be construed as any limitation on the implementation processes of the embodiments of this application.

A person of ordinary skill in the art may be aware that, in combination with examples of units and algorithm steps described in the embodiments disclosed in this specification, the embodiments may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the embodiments of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and there may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or other forms. The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the prior art, or some of the technical solutions may be embodied in a form of a software product. The computer software product is stored in a storage medium, and includes several instructions for instructing a computer device (which may be a personal computer, a server, a network device, or the like) to perform all or some of the steps of the methods described in the embodiments of this application. The foregoing storage medium includes: any medium that can store program code, such as a USB flash drive, a removable hard disk, a read-only memory ROM, a random access memory RAM, a magnetic disk, or an optical disc.

The foregoing descriptions are merely specific implementations of the embodiments of this application, but are not intended to limit the protection scope of the embodiments of this application. Any variation or replacement readily figured out by a person skilled in the art within the technical scope disclosed in the embodiments of this application shall fall within the protection scope of the embodiments of this application.

What is claimed is:

1. A communication method, comprising:
   receiving, by a core network device, a first message from an access network device, wherein the first message carries information used to indicate a slice supported by the access network device;
   in response to receiving the first message, sending, by the core network device, a second message to the access network device, wherein the second message carries information used to indicate a slice supported by the core network device;
   receiving, by the core network device, an initial attach request message from the access network device, wherein the initial attach request message is sent by user equipment (UE) and forwarded by the access network device, and wherein the initial attach request message carries configured network slice selection assistance information (NSSAI); and
   in response to receiving the initial attach request message from the access network device:
      determining, by the core network device, accepted NSSAI of the UE based on the configured NSSAI; and
      determining, by the core network device, a location area identity list of the UE based on the accepted NSSAI of the UE and the information used to indicate the slice supported by the access network device, wherein the location area identity list of the UE includes one or more access network devices to which a paging message of the UE is sent.

2. The method according to claim 1, wherein the first message is a broadcast message.

3. The method according to claim 1, wherein the determining, by the core network device, a location area identity list of the UE based on the accepted NSSAI of the UE and the information used to indicate the slice supported by the access network device comprises:
   determining, by the core network device and based on information about one or more slices to which the UE is allowed to access and obtained information about one or more slices supported by the access network device, whether the access network device or a cell covered by the access network device is located in a location area of the UE.

4. The method according to claim 1, wherein the first message is a connection setup request message, wherein the connection setup request message is used by the access network device to set up a connection to the core network device,
   wherein the second message is a connection setup response message, and wherein the information used to indicate the slice supported by the core network device is used by the access network device to select the core network device for the UE.

5. The method according to claim 4, wherein the method further comprises:

sending, by the core network device, a configuration update message to the access network device, wherein the configuration update message is used to update the information used to indicate the slice supported by the core network device.

6. The method according to claim 5, wherein the method further comprises:
sending, by the core network device, indication information to the access network device, wherein the indication information is used to instruct the access network device to reselect a core network device for the UE.

7. The method according to claim 4, wherein the method further comprises:
receiving, by the core network device, a configuration update message from the access network device, wherein the configuration update message is used to update the information used to indicate the slice supported by the access network device.

8. The method according to claim 4, wherein:
the information used to indicate the slice supported by the core network device is used to identify NSSAI corresponding to one or more slices supported by the core network device or single network slice selection assistance information (S-NSSAI) respectively corresponding to one or more slices supported by the core network device; or
the information used to indicate the slice supported by the core network device comprises a slice identity (ID).

9. The method according to claim 4, wherein the information used to indicate the slice supported by the core network device is used to indicate whether the core network device is a default core network device.

10. The method according to claim 4, wherein the information used to indicate the slice supported by the core network device comprises a group identity of a core network device group to which the core network device belongs, and wherein the core network device group comprises one or more core network devices supporting a same slice.

11. A communication method, comprising:
sending, by an access network device, a connection setup request message to a core network device, wherein the connection setup request message carries information about a slice supported by the access network device, wherein the information about the slice supported by the access network device is used by the core network device to determine a location area identity list of user equipment (UE), and wherein the location area identity list of the UE includes one or more access network devices to which a paging message of the UE is sent;
receiving, by the access network device, a connection setup response message from the core network device, wherein the connection setup response message carries information about a slice supported by the core network device;
receiving, by the access network device, an initial attach request message from the UE, wherein the initial attach request message carries configured network slice selection assistance information (NSSAI);
in response to receiving the initial attach request message from the UE, selecting, by the access network device, the core network device for the UE based on the information about the slice supported by the core network device, wherein the information about the slice supported by the core network device includes an end-to-end (E2E) slice identity (ID), and the location area identity list of the UE is determined based on the E2E slice ID and a correspondence between an E2E slice ID and NSSAI; and
in response to selecting the core network device for the UE, forwarding, by the access network device, the initial attach request message to the core network device.

12. The method according to claim 11, wherein the method further comprises:
receiving, by the access network device, a configuration update message from the core network device, wherein the configuration update message is used to update the information about the slice supported by the core network device.

13. The method according to claim 12, wherein the method further comprises:
receiving, by the access network device, indication information sent by the core network device; and
reselecting, by the access network device, a core network device for the UE according to the indication information.

14. The method according to claim 11, wherein the method further comprises:
sending, by the access network device, a configuration update message to the core network device, wherein the configuration update message is used to update the information about the slice supported by the access network device.

15. A core network device, comprising:
a transceiver, the transceiver configured to:
receive a first message from an access network device, wherein the first message carries information used to indicate a slice supported by the access network device;
in response to receiving the first message, send a second message to the access network device, wherein the second message carries information used to indicate a slice supported by the core network device;
receive an initial attach request message from the access network device, wherein the initial attach request message is sent by user equipment (UE) and forwarded by the access network device, and wherein the initial attach request message carries configured network slice selection assistance information (NSSAI);
at least one processor; and
one or more memories coupled to the at least one processor and storing programming instructions for execution by the at least one processor to:
in response to receiving the initial attach request message from the access network device:
determine accepted NSSAI of the UE based on the configured NSSAI; and
determine a location area identity list of the UE based on the accepted NSSAI of the UE and the information used to indicate the slice supported by the access network device, wherein the location area identity list of the UE includes one or more access network devices to which a paging message of the UE is sent.

16. The core network device according to claim 15, wherein the first message is a connection setup request message, wherein the connection setup request message is used by the access network device to set up a connection to the core network device, wherein the second message is a connection setup response message, and wherein the information used to indicate the slice supported by the core network device is used by the access network device to select the core network device for the UE.

17. The core network device according to claim 16, wherein the programming instructions are for execution by the at least one processor to:
   determine, based on information about one or more slices to which the UE is allowed to access and obtained information about one or more slices supported by the access network device, whether the access network device or a cell covered by the access network device is located in a location area of the UE.

18. The core network device according to claim 16, wherein the transceiver is further configured to:
   send a configuration update message to the access network device, wherein the configuration update message is used to update the information used to indicate the slice supported by the core network device.

19. The core network device according to claim 15, wherein the transceiver is further configured to:
   receive a configuration update message from the access network device, wherein the configuration update message is used to update the information used to indicate the slice supported by the access network device.

20. The core network device according to claim 15, wherein the first message is a broadcast message.

* * * * *